United States Patent
Lee et al.

(10) Patent No.: US 9,778,116 B2
(45) Date of Patent: Oct. 3, 2017

(54) DUPLEX CALORIMETER

(71) Applicant: Korea Institute of Energy Research, Daejeon (KR)

(72) Inventors: Jae Yong Lee, Seoul (KR); Yong Hoon Im, Daejeon (KR); Sae Byul Kang, Daejeon (KR); Dong Hyun Lee, Seoul (KR); Dae Hun Chung, Seoul (KR); Byung Sik Park, Daejeon (KR); Gyu Sung Choi, Daejeon (KR)

(73) Assignee: Korea Institute of Energy Research, Daejeon (KR)

( * ) Notice: Subject to any disclaimer, the term of this patent is extended or adjusted under 35 U.S.C. 154(b) by 283 days.

(21) Appl. No.: 14/441,204

(22) PCT Filed: Jan. 9, 2013

(86) PCT No.: PCT/KR2013/000163
§ 371 (c)(1),
(2) Date: May 7, 2015

(87) PCT Pub. No.: WO2014/073746
PCT Pub. Date: May 15, 2014

(65) Prior Publication Data
US 2015/0268104 A1     Sep. 24, 2015

(30) Foreign Application Priority Data

Nov. 8, 2012 (KR) .................. 10-2012-0126295

(51) Int. Cl.
*G01K 17/00* (2006.01)
*G01K 17/10* (2006.01)

(52) U.S. Cl.
CPC .................... *G01K 17/10* (2013.01)

(58) Field of Classification Search
None
See application file for complete search history.

(56) References Cited

U.S. PATENT DOCUMENTS

| 5,389,117 | A * | 2/1995 | Firey ................ C10J 3/20 110/229 |
| 2011/0159389 | A1* | 6/2011 | Ohara ............... F24D 19/1048 429/429 |

FOREIGN PATENT DOCUMENTS

| JP | 2002-257584 A | 9/2002 |
| JP | 2002-357485 A | 12/2002 |

(Continued)

*Primary Examiner* — Erica Lin
(74) *Attorney, Agent, or Firm* — Hammer & Associates, P.C.

(57) ABSTRACT

The duplex calorimeter, connected between a first and a second demand sides to measure a caloric heat energy between the demand sides, includes a first pipe connected to the first demand side, a second pipe connected to the second demand side, first and second branch pipes, branched into two directions between the first pipe and the second pipe, a first flow rate measuring part measuring a flow rate of the heat energy in the first branch pipe, a second flow rate measuring part measuring a flow rate of the heat energy in the second branch pipe, a temperature measuring part measuring a temperature of the heat energy in either branch pipe, and a calculating part calculating the caloric value based on the flow rate measured by the first flow rate measuring part or the second flow rate measuring part and the temperature measured by the temperature measuring part.

13 Claims, 2 Drawing Sheets

(56) References Cited

FOREIGN PATENT DOCUMENTS

| | | | |
|---|---|---|---|
| KR | 10-1991-0005044 | A | 3/1991 |
| KR | 20-0402054 | Y1 | 11/2005 |
| KR | 10-2011-0123182 | A | 11/2011 |

* cited by examiner

DUPLEX CALORIMETER

CROSS-REFERENCE TO RELATED APPLICATION

This application claims priority to and the benefit of Korean Patent Application No. 2012-0126295, filed on Nov. 8, 2012, the disclosure of which is incorporated herein by reference in its entirety.

BACKGROUND

1. Field of the Invention

The present invention relates to a calorimeter, and more particularly, to a duplex calorimeter for a thermal energy network based on a duplex heat transaction.

2. Discussion of Related Art

A thermal energy network is a system in which a heat source and a consumer are connected through a pipe transporting a heating medium. An existing district heating manner is one kind of the thermal energy network system.

A conventional thermal energy network system is a one-way heat supplying manner in which heat energy is supplied from a supply side to a demand side. More specifically, if the supply side supplies a high temperature heating medium to the demand side, the demand side obtains the heat energy from the high temperature heating medium. The heating medium having a low temperature by providing the heat energy to the demand side is collected again to the supply side.

At this time, a calorimeter is provided in order to charge a fee based on a calorific value of the heat energy supplied from the supply side to the demand side. The calorimeter may be installed at one of a supplying pipe or a collecting pipe. This is because an amount of the heating medium supplied from the supply side to the demand side is the same as that of heating medium collected from the demand side to the supply side. Generally, since the supplying pipe receives the high temperature heating medium and thus has a high temperature, the calorimeter is mainly installed at the collecting pipe in order to avoid the calorimeter from being exposed to the high temperature.

The calorimeter includes a flowmeter, a thermometer, and a calculating part. The flowmeter measures a flow rate of the heating medium between the supply side and the demand side, the thermometer measures a temperature difference between the heating medium being supplied and the heating medium being collected, and the calculating part calculates the calorific value of the heat energy supplied from the supply side to the demand side based on the measured flow rate and temperature difference.

Meanwhile, leading on from the one-way thermal energy network in which heat is supplied from only the supply side, a new thermal energy network system based on a duplex heat transaction is recently arising.

In a duplex heat transaction system, the supply side supplies the heat energy to the demand side, and when the demand side produces surplus heat energy through its own heat source, the demand side may supply the heat energy to the supply side.

This duplex heat transaction may be achieved between the demand sides as well as between the supply side and the demand side.

Therefore, upon the duplex heat transaction, it is necessary to precisely measure the calorific value supplied from the supply side to the demand side.

However, since only a one-way calorific value is measured in a conventional calorimeter, measurement itself of a duplex calorific value is impossible. In order to measure the duplex calorific value, it is necessary to separately provide the calorimeter in each direction.

SUMMARY OF THE INVENTION

The present invention is directed to a duplex calorimeter which may measure a duplex calorific value using one device in a thermal energy network based on a duplex heat transaction.

According to an aspect of the present invention, there is provided an A duplex calorimeter which is connected between a first demand side and a second demand side so as to measure a calorific value of heat energy between the first and second demand sides, including: a first connection pipe of which one end is connected to a pipe of the first demand side; a second connection pipe of which one end is connected to a pipe of the second demand side; first and second branch pipes which are branched into two directions between the other end of the first connection pipe and the other end of the second connection pipe; a first flow rate measuring part disposed at the first branch pipe so as to measure a flow rate of the heat energy passing through the first branch pipe; a second flow rate measuring part disposed at the second branch pipe so as to measure a flow rate of the heat energy passing through the second branch pipe; a temperature measuring part measuring a temperature of the heat energy in the first branch pipe or the second branch pipe; and a calculating part calculating the calorific value based on the flow rate measured by the first flow rate measuring part or the second flow rate measuring part and the temperature measured by the temperature measuring part.

One end of the first branch pipe is connected to the other end of the first connection pipe, and the other end thereof is connected to the other end of the second connection pipe, and one end of the second branch pipe is connected to the other end of the first connection pipe, and the other end thereof is connected to the other end of the second connection pipe.

The duplex calorimeter may further include a valve part disposed at least one of branch points of the first and second branch pipes disposed at sides of the first and second connection pipes so as to control a flow of the heat energy between the first and second demand sides.

The duplex calorimeter may further include a valve part disposed at a branch point of the first and second branch pipes disposed at a side of the first connection pipe.

The valve part opens and closes between the first connection pipe and the first branch pipe or between the first connection pipe and the second branch pipe.

The duplex calorimeter may further include a valve part disposed at a branch point of the first and second branch pipes disposed at a side of the second connection pipe.

The valve part opens and closes between the second connection pipe and the first branch pipe or between the second connection pipe and the second branch pipe.

The valve part is a three-way valve.

The duplex calorimeter may further include a control part controlling an operation of the valve part.

The first and second flow rate measuring parts are impeller type flowmeters.

The first flow rate measuring part controls a flow of the heat energy in the first branch pipe, and the second flow rate measuring part controls a flow of the heat energy in the second branch pipe.

The first branch pipe receives the heat energy supplied or collected from the first demand side to the second demand side, and the second branch pipe receives the heat energy supplied or collected from the second demand side to the first demand side.

The temperature measuring part may include a first temperature measuring part disposed at the first branch pipe to measure a temperature of the heat energy passing through the first branch pipe; and a second temperature measuring part disposed at the second branch pipe to measure a temperature of the heat energy passing through the second branch pipe.

The first flow rate measuring part and the first temperature measuring part are integrally formed with each other, and the second flow rate measuring part and the second temperature measuring part are integrally formed with each other.

BRIEF DESCRIPTION OF THE DRAWINGS

The above and other objects, features, and advantages of the present invention will become more apparent to those of ordinary skill in the art by describing in detail exemplary embodiments thereof with reference to the accompanying drawings, in which.

DETAILED DESCRIPTION OF EXEMPLARY EMBODIMENTS

Figure 1:
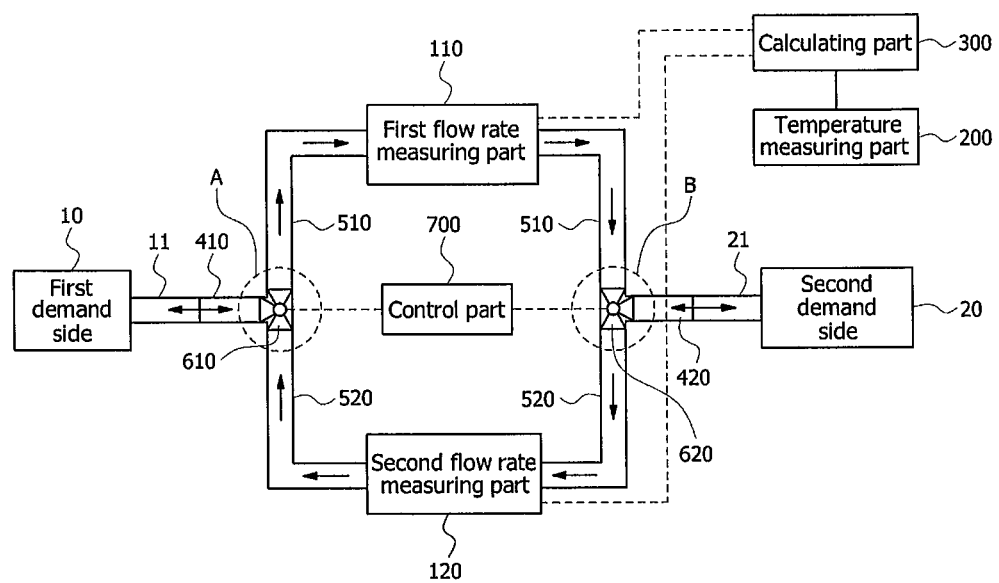
FIG. 1 is a block diagram illustrating a duplex calorimeter according to an exemplary embodiment of the present invention.

An example embodiment of the present invention is described below in sufficient detail to enable those of ordinary skill in the art to embody and practice the present invention. It will be understood that the present invention may be embodied in many alternative forms, is not limited to the example embodiment set forth herein, and covers all modifications, equivalents, and alternatives to the example embodiment that fall within the spirit and scope of the appended claims.

It will be understood that, although the terms first, second, A, B, etc. may be used herein in reference to elements of the invention, such elements should not be construed as limited by these terms. For example, a first element could be termed a second element, and a second element could be termed a first element, without departing from the scope of the present invention. Herein, the term "and/or" includes any and all combinations of one or more referents.

It will be understood that when an element is referred to as being "on," "connected" or "coupled" to another element, it can be directly on, connected or coupled to the other element or intervening elements may be present. In contrast, when an element is referred to as being "directly on," "directly connected" or "directly coupled" to another element, there are no intervening elements. Other terms used to describe relationships between elements should be interpreted in a like fashion (i.e., "between" versus "directly between," "adjacent" versus "directly adjacent," etc.).

The terminology used herein to describe an embodiment of the invention is not intended to limit the scope of the invention. The articles "a," "an," and "the" are singular in that they have a single referent, however the use of the singular form in the present document should not preclude the presence of more than one referent. In other words, elements of the invention referred to in the singular may number one or more, unless the context clearly indicates otherwise. It will be further understood that the terms "comprises," "comprising," "includes," and/or "including," when used herein, specify the presence of stated features, numbers, steps, operations, elements, and/or components, but do not preclude the presence or addition of one or more other features, numbers, steps, operations, elements, components, and/or groups thereof.

Unless otherwise defined, all terms (including technical and scientific terms) used herein are to be interpreted as is customary in the art to which this invention belongs. It will be further understood that terms in common usage should also be interpreted as is customary in the relevant art and not in an idealized or overly formal sense unless expressly so defined herein.

The present invention will now be described more fully with reference to the accompanying drawings, in which an exemplary embodiment of the present invention is shown. Throughout the drawings and the description, parts will be consistently denoted by the same respective reference numerals and described in detail only once.

FIG. 1 is a block diagram illustrating a duplex calorimeter according to an exemplary embodiment of the present invention.

Referring to FIG. 1, a duplex calorimeter according to an exemplary embodiment of the present invention is connected between a first demand side 10 and a second demand side 20, and basically includes first and second flow rate measuring parts 110 and 120, a temperature measuring part 200 and a calculating part 300, and further includes first and second connection pipes 410 and 420 and first and second branch pipes 510 and 520.

Specifically, one end of the first connection pipe 410 is connected to a pipe 11 of the first demand side 10, and one end of the second connection pipe 420 is connected to a pipe 21 of the second demand side 20. That is, the duplex calorimeter of the present invention is connected to a pipe in a thermal energy network through the first and second connection pipes 410 and 420.

A term "one and the other side" is used herein to explain positions of both ends of a pipe in a connection structure of the pipe, the other side means an opposite position to the one side of the both ends of the pipe, and it does not means that all of the one sides of the pipes have the same direction.

Meanwhile, in the specification, the terms "first and second demand sides 10 and 20" is just for convenience of explanation, and the first and second demand sides 10 and 20 may serve as all of a heat source and a demand side. Further, the pipe 11 of the first demand side 10 and the pipe 21 of the second demand side 20 may be supplying pipes or collecting pipes.

In one exemplary embodiment, the first and second connection pipes 410 and 420 may include a fastening structure such as screw-coupling to connect the pipe 11 of the first demand side 10 and the pipe 21 of the second demand side 20 with the calorimeter.

The first and second branch pipes 510 and 520 are respectively branched into two directions and disposed in parallel between the first and second connection pipes 410 and 420, i.e., the other end of the first connection pipe 410 and the other end of the second connection pipe 420.

Specifically, one end of the first branch pipe 510 is connected to the other end of the first connection pipe 410, and the other end thereof is connected to the other end of the second connection pipe 420. And one end of the second branch pipe 520 is connected to the other end of the first connection pipe 410, and the other end thereof is connected to the other end of the second connection pipe 420.

In one exemplary embodiment, the first branch pipe 510 may receive the heat energy supplied or collected from the first demand side 10 to the second demand side 20, and the second branch pipe 520 may receive the heat energy supplied or collected from the second demand side 20 to the first demand side 10. At this time, the pipe 11 of the first demand side 10 and the pipe 21 of the second demand side 20 may be the supplying pipes or the collecting pipes, as described above. In case of the supplying pipes, if the first branch pipe 510 receives the heat energy supplied from the first demand side 10 to the second demand side 20, the second branch pipe 520 may receive the heat energy supplied from the second demand side 20 to the first demand side 10. And in case of the collecting pipes, if the first branch pipe 510 receives the heat energy collected from the first demand side 10 to the second demand side 20, the second branch pipe 520 may receive the heat energy collected from the second demand side 20 to the first demand side 10. That is, in the present invention, the two branch pipes 510 and 520 are installed in one calorimeter, and each branch pipe 510, 520 has a different flow direction of the heat energy from each other.

The first flow rate measuring part 110 may be installed at the first branch pipe 510 so as to measure a flow rate of the heat energy passing through the first branch pipe 510, and the second flow rate measuring part 120 may be installed at the second branch pipe 520 so as to measure a flow rate of the heat energy passing through the second branch pipe 520.

Therefore, in the present invention, each flow rate having different directions from each other may be measured by one calorimeter.

In one exemplary embodiment, each of the first and second flow rate measuring parts 110 and 120 may be an impeller flowmeter which may control a flow of the heat energy in each branch pipe 510, 520 by rotating or stopping an impeller.

The temperature measuring part 200 measures a temperature of the heat energy in the first or second branch pipe 510 or 520. Specifically, when the first and second branch pipes 510 and 520 are the supplying pipes, the temperature measuring part 200 measures a temperature difference between the collecting pipe (not shown) and the first or second branch pipe 510 or 520. And when the first and second branch pipes 510 and 520 are the collecting pipes, the temperature measuring part 200 measures a temperature difference between the supplying pipe (not shown) and the first or second branch pipe 510 or 520.

To this end, the temperature measuring part 200 of one exemplary embodiment may include a first temperature measuring part (not shown) installed at the first branch pipe 510 to measure the temperature of the heat energy passing through the first branch pipe 510, and a second temperature measuring part (not shown) installed at the second branch pipe 520 to measure the temperature of the heat energy passing through the second branch pipe 520.

Further, the temperature measuring part 200 may further include a third temperature measuring part (not shown) installed at the supplying pipe or the collecting pipe to measure the temperature of the heat energy passing through the corresponding pipe. At this time, the temperature measuring part installed at each of the branch pipes 510 and 520 may be detachably or integrally formed from/with the flow rate measuring part 110, 120 of the corresponding pipe.

The calculating part 300 calculates a calorific value based on a flow rate measured by the first or second flow rate measuring part 110 or 120 and a temperature measured by the temperature measuring part 200.

At this time, a flow rate measuring method in the flow rate measuring part 110, 120, a temperature measuring method in the temperature measuring part 200 and a calorific value measuring method in the calculating part 300 may use well-know general methods, and thus detailed descriptions thereof will be omitted.

That is, in the present invention, since one calorimeter includes the pipe receiving the heat energy flowing in a normal direction, and the pipe receiving the heat energy flowing in a reverse direction, and the flow rate measuring part installed in each pipe, all of the heat energy flowing in the normal direction and the reverse direction may be measured by one calorimeter.

The duplex calorimeter according to the exemplary embodiment of the present invention may further include at least one valve part 610, 620 and a control part 700 controlling the valve part 610, 620.

In the exemplary embodiment of FIG. 1, two valve parts 610 and 620 are provided, but the valve part 610, 620 may be installed at at least one of both branch points A and B of the first and second branch pipes 510 and 520 so as to control the flow of the heat energy between the first and second demand sides 10 and 20.

The valve part 610 installed at the branch point A disposed at the side of the first connection pipe 410 out of the branch points A and B of the first and second branch pipes 510 and 520 may open and close between the first connection pipe 410 and the first branch pipe 510 or between the first connection pipe 410 and the second branch pipe 520. At this time, since the heat energy does not flow simultaneously in both directions, but flows in one of the both directions, the valve part 610 may close between the first connection pipe 410 and the second branch pipe 520, when opening between the first connection pipe 410 and the first branch pipe 510. On the contrary to this, the valve part 610 may close between the first connection pipe 410 and the first branch pipe 510, when opening between the first connection pipe 410 and the second branch pipe 520.

The valve part 620 installed at the branch point B disposed at the side of the second connection pipe 420 out of the branch points A and B of the first and second branch pipes 510 and 520 may open and close between the second connection pipe 420 and the first branch pipe 510 or between the second connection pipe 420 and the second branch pipe 520. The opening and closing at each branch point may be controlled by the same manner as in the valve part 610 at the side of the first connection pipe 410.

As described above, the valve part 610, 620 may be installed at only one of the branch points A and B or may be installed at both of the branch points A and B. In the case that the valve part 610, 620 is installed at both of the branch points A and B, the two valve parts 610 and 620 opens and closes the same route.

In one exemplary embodiment, the valve part 610, 620 may be a three-way valve.

Figure 2A:
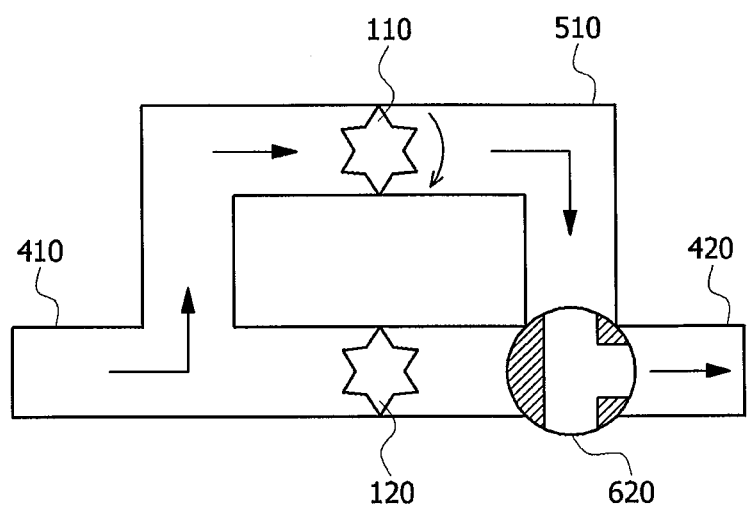
FIGS. 2A and 2B are views illustrating driving embodiments of a valve part.
Figure 2B:
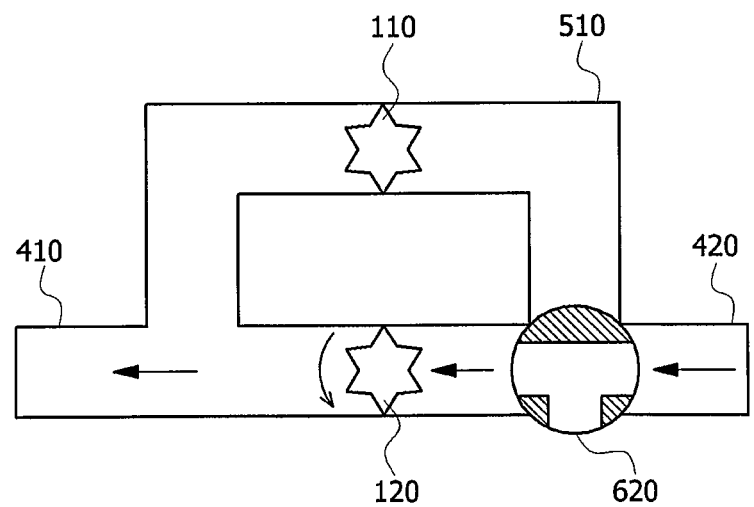

FIGS. 2A and 2B are views illustrating driving embodiments of the valve part 610, 620, wherein the valve part 620 is installed at the branch point B disposed at the side of the second connection pipe 420.

First of all, FIG. 2A is a view illustrating a case in which the heat energy flows from the first demand side 10 to the second demand side 20 in FIG. 1, that is, the first demand side 10 serves as a supply side, and the second demand side 20 serves as a demand side.

Referring to FIG. 2A, the first flow rate measuring part 110 which is the impeller flowmeter is rotated toward the second demand side 20, and the second flow rate measuring part 120 is maintained in a stopped state. Further, the valve part 620 is operated to open between the second connection pipe 420 and the first branch pipe 510, and thus the heat energy is introduced from the first demand side 10 to the second branch pipe 520, and an error in measuring the calorific value is prevented.

Therefore, the heat energy supplied from the first demand side 10 to the second demand side 20 is measured by the first flow rate measuring part 110, and the temperature is measured by the temperature measuring part 200, and also the calorific value is calculated by the calculating part 300.

And FIG. 2B is a view illustrating a case in which the heat energy flows from the second demand side 20 to the first demand side 10, that is, the second demand side 20 serves as the supply side, and the first demand side 10 serves as the demand side.

Referring to FIG. 2B, the second flow rate measuring part 120 which is the impeller flowmeter is rotated toward the first demand side 10, and the first flow rate measuring part 110 is maintained in the stopped state. Further, the valve part 620 is operated to open between the second connection pipe 420 and the second branch pipe 520, and thus the heat energy is introduced from the second demand side 20 to the first branch pipe 510, and the error in measuring the calorific value is prevented.

Therefore, the heat energy supplied from the second demand side 20 to the first demand side 10 is measured by the second flow rate measuring part 120, and the temperature is measured by the temperature measuring part 200, and also the calorific value is calculated by the calculating part 300.

According to the present invention, since the two branch pipes which may receive the duplex heat energy are provided in one device so as to measure the calorific value in each branch pipe, it is possible to measure the duplex calorific values with one device.

Further, according to the present invention, since the valve part is provided at each branch point of the branch pipes, it is possible to easily open and close the branch pipes through the operation of the valve part. Therefore, it is possible to measure the flow rate of the heat energy flowing between the demand sides without an error, and thus it is possible to precisely measure the calorific value.

While the present invention has been particularly shown and described with reference to an exemplary embodiment thereof, it will be understood by those of ordinary skill in the art that various modifications can be made to the described embodiment without departing from the scope of the present invention as defined by the appended claims.

What is claimed is:

1. A duplex calorimeter which is connected between a pipe of first demand side and a pipe of second demand side so as to measure a caloric value of heat energy between the first and second demand sides, comprising:
   a first connection pipe of which one end is connected to the pipe of the first demand side;
   a second connection pipe of which one end is connected to the pipe of the second demand side;
   first and second branch pipes which are branched into two directions between the other end of the first connection pipe and the other end of the second connection pipe;
   a first flow rate measuring part disposed at the first branch pipe so as to measure a flow rate of the heat energy passing through the first branch pipe;
   a second flow rate measuring part disposed at the second branch pipe so as to measure a flow rate of the heat energy passing through the second branch pipe;
   a temperature measuring part measuring a temperature of the heat energy in the first branch pipe or the second branch pipe; and
   a calculating part calculating the caloric value based on the flow rate measured by the first flow rate measuring part or the second flow rate measuring part and the temperature measured by the temperature measuring part,
   wherein one end of the first branch pipe is connected to the other end of the first connection pipe, and the other end thereof is connected to the other end of the second connection pipe, and
   one end of the second branch pipe is connected to the other end of the first connection pipe, and the other end thereof is connected to the other end of the second connection pipe.

2. The duplex calorimeter of claim 1, further comprising a valve part disposed at least one of branch points of the first and second branch pipes disposed at sides of the first and second connection pipes so as to control a flow of the heat energy between the first and second demand sides.

3. The duplex calorimeter of claim 1, further comprising a valve part disposed at a branch point of the first and second branch pipes disposed at a side of the first connection pipe.

4. The duplex calorimeter of claim 3, wherein the valve part opens and closes between the first connection pipe and the first branch pipe or between the first connection pipe and the second branch pipe.

5. The duplex calorimeter of claim 1, further comprising a valve part disposed at a branch point of the first and second branch pipes disposed at a side of the second connection pipe.

6. The duplex calorimeter of claim 5, wherein the valve part opens and closes between the second connection pipe and the first branch pipe or between the second connection pipe and the second branch pipe.

7. The duplex calorimeter of claim 2, wherein the valve part is a three-way valve.

8. The duplex calorimeter of claim 2, further comprising a control part controlling an operation of the valve part.

9. The duplex calorimeter of claim 1, wherein the first and second flow rate measuring parts are impeller type flowmeters.

10. The duplex calorimeter of claim 1, wherein the first flow rate measuring part controls a flow of the heat energy in the first branch pipe, and
    the second flow rate measuring part controls a flow of the heat energy in the second branch pipe.

11. The duplex calorimeter of claim 1, wherein the first branch pipe receives the heat energy supplied or collected from the first demand side to the second demand side, and
    the second branch pipe receives the heat energy supplied or collected from the second demand side to the first demand side.

12. The duplex calorimeter of claim 1, wherein the temperature measuring part comprises:
    a first temperature measuring part disposed at the first branch pipe to measure a temperature of the heat energy passing through the first branch pipe; and a second temperature measuring part disposed at the second branch pipe to measure a temperature of the heat energy passing through the second branch pipe.

13. The duplex calorimeter of claim 12, wherein the first flow rate measuring part and the first temperature measuring part are integrally formed with each other, and the second flow rate measuring part and the second temperature measuring part are integrally formed with each other.

* * * * *